United States Patent
Bamler et al.

(10) Patent No.: US 8,891,066 B2
(45) Date of Patent: Nov. 18, 2014

(54) METHOD FOR GEO-REFERENCING OF OPTICAL REMOTE SENSING IMAGES

(75) Inventors: Richard Bamler, München (DE); Peter Reinartz, Dießen (DE); Sahil Suri, Darmstadt (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 507 days.

(21) Appl. No.: 13/130,906

(22) PCT Filed: Nov. 18, 2009

(86) PCT No.: PCT/EP2009/065361
§ 371 (c)(1),
(2), (4) Date: Aug. 9, 2011

(87) PCT Pub. No.: WO2010/057903
PCT Pub. Date: May 27, 2010

(65) Prior Publication Data
US 2012/0127028 A1     May 24, 2012

(30) Foreign Application Priority Data

Nov. 24, 2008    (DE) .................. 10 2008 058 769

(51) Int. Cl.
- *G01C 3/08* (2006.01)
- *G01C 11/00* (2006.01)
- *G01S 13/86* (2006.01)
- *G01S 13/90* (2006.01)

(52) U.S. Cl.
CPC ................. *G01C 11/00* (2013.01); *G01S 13/90* (2013.01); *G01S 13/867* (2013.01); *G01S 13/86* (2013.01)
USPC ....... 356/3.01; 356/3.09; 356/3.12; 356/4.01; 356/4.07; 356/5.01; 356/5.09; 356/9; 356/625

(58) Field of Classification Search
USPC ............ 356/3.01, 3.09, 312, 4.01, 4.07, 5.01, 356/5.09, 9, 625
See application file for complete search history.

(56) References Cited

U.S. PATENT DOCUMENTS

| | | | |
|---|---|---|---|
| 5,552,787 A | 9/1996 | Schuler | |
| 5,995,681 A * | 11/1999 | Lee et al. | 382/293 |
| 6,757,445 B1 | 6/2004 | Knopp | |
| 7,898,458 B2 * | 3/2011 | Shibayama et al. | 342/25 A |
| 8,385,672 B2 * | 2/2013 | Giuffrida et al. | 382/254 |

FOREIGN PATENT DOCUMENTS

WO    WO 2008034465 A1 *   3/2008

OTHER PUBLICATIONS

International Search Report for corresponding patent application No. PCT/EP2009/065361 dated Feb. 3, 2010.

* cited by examiner

*Primary Examiner* — Luke Ratcliffe
*Assistant Examiner* — Samantha K Abraham
(74) *Attorney, Agent, or Firm* — Renner, Otto, Boisselle & Sklar, LLP

(57) ABSTRACT

In the method for geo-referencing of optical remote sensing images of an area of the earth's surface, the geo-referencing is corrected based on an SAR image which is geo-referenced.

7 Claims, 1 Drawing Sheet

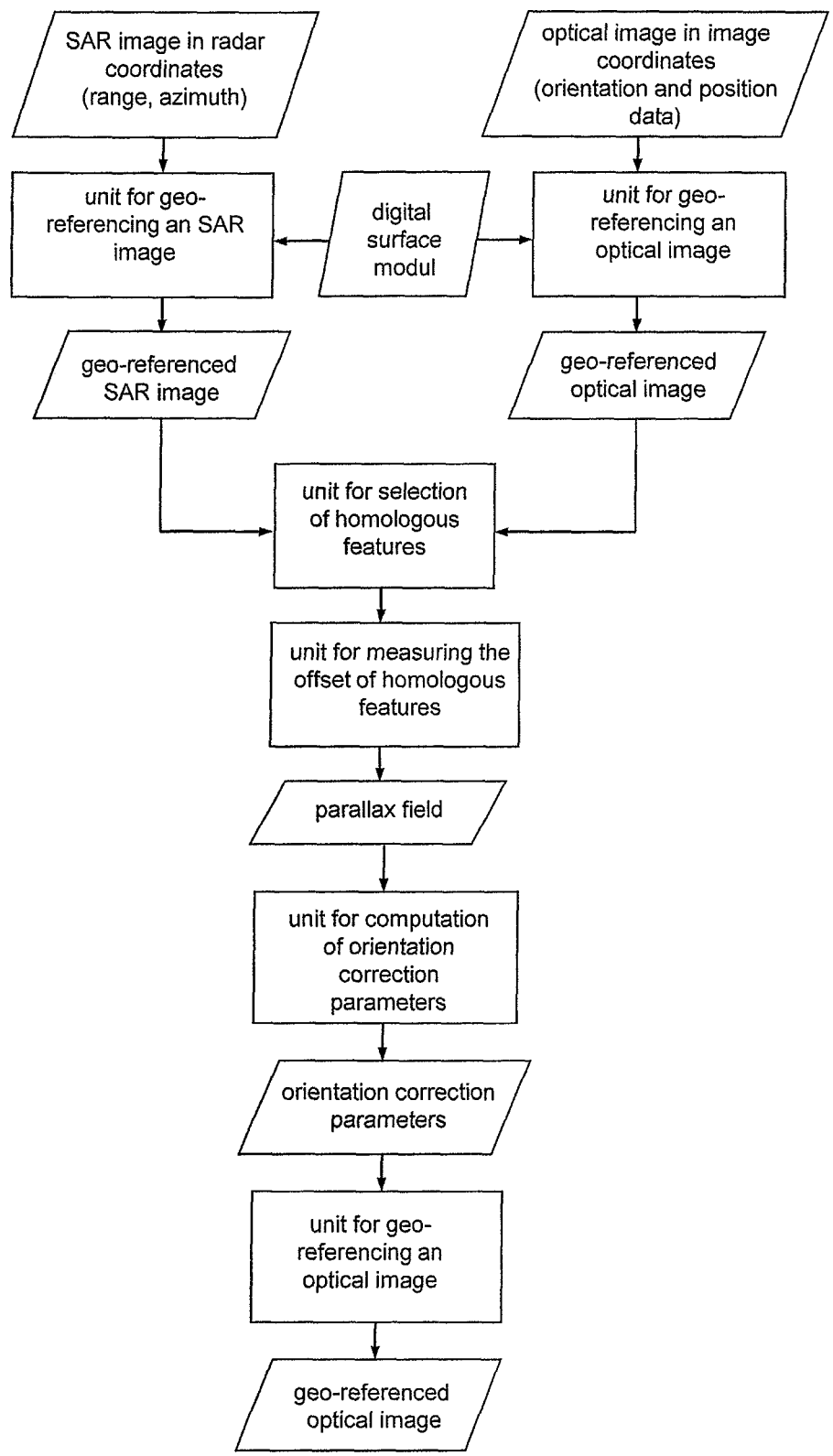

METHOD FOR GEO-REFERENCING OF OPTICAL REMOTE SENSING IMAGES

The invention relates to a method for the geo-referencing of optical remote sensing images.

DESCRIPTION OF THE TECHNICAL PROBLEM AND OF THE STATE OF THE ART

Geo-referencing of remote sensing image data captured from a satellite or from other platforms (e.g. airplane, airship, UAV) is defined as the assigning of 3-D geo coordinates to each picture element. Only after geo-referencing, these image data can be projected into random geometries, be interpreted cartographically and, e.g. in geographic information systems, be blended with geo data of different origin or with images taken by use of a different imaging geometry. Also temporal changes of the earth's surface can be automatically detected with the aid of remote sensing images only under the precondition that the image data of a time series have been registered with precise fit relative to each other, and optimally in the form of absolute coordinates. For full automation of processing chains, the precision of the geo-referencing should be better than the spatial resolution of the image data. Thus, precise geo-referencing is an essential step in the processing of remote sensing image data.

In high-resolution remote sensing of the earth's surface, two technologies for obtaining an image are used with preference:

1) Electro-optical cameras will supply images (hereunder referred to as "optical images") in the visible and in the infrared spectral range. Each captured picture element (pixel) of the camera represents two angles and the position of the instrument along its flight trajectory (this system being hereunder referred to as a "native optical coordinate system"). The direct geo-referencing is performed by forward intersection of the so-called line-of-sight vector with a digital surface model (DSM). The precision will depend, apart from the knowledge about the inner orientation of the camera, on the measurements of the position and the orientation of the camera in space, the latter aspect pertaining to the angles which are measured on board of the platform and are available for processing. While the measurement of the inner orientation by calibration and the measurement of the position by GPS can be performed with high precision, said angles can be measured by the usual instruments merely with a precision which in the best case will correspond to a geo-referencing precision in an order of magnitude of 10 m. Some satellite operators supply this orientation information in integrated form as coefficients of a polynomial, the so-called RPCs (rational polynomial coefficients). Thereby, in the best case, one will reach the same results as in the case of the direct geo-referencing method and will thus still remain in the same precision range. Improvements can be achieved only by introducing ground control information (3-D points), wherein the position of these 3-D points is precisely known and these points can also be determined in the image. This way, one will ultimately reach levels of precision in the range of half the pixel size.

2) Synthetic aperture radar (SAR) instruments use an active microwave imaging method which delivers images regardless of sunlight and cloudiness. Each pixel defines a distance to the instrument, the so-called "range", and a position of the instrument along its flight trajectory, the so-called "azimuth" coordinate (this system being referred to hereunder as a "native SAR coordinate system"). Angles of view, as in the optical imaging system, cannot be differentiated by an SAR. Geo-referencing is carried out by a cut through a sphere having the radius of the given range, through a cone envelope being rotationally symmetrical with the instant velocity (in earth-fixed coordinates) of the instrument and representing the Doppler frequency of the processing algorithm, and through the DSM of the imaged terrain. In most cases, the data were processed onto a Doppler frequency of zero; the cone envelope will then become a plane extending vertically to the present instrument speed. The precision depends, first, on the site of the instrument at each point of time and, second, on the accuracy of the direction of the speed vector. Both values are measurable with high precision by use of modern GNSS instruments on board of the platform. Further errorgenerating influences, such as e.g. propagation delays caused by the ionosphere and the troposphere, can be largely corrected for with the aid of external additional information.

Due to the large distance between remote-sensing sensors and the object which is to be imaged, even the smallest measurable angular errors in the geo-referencing of optical images will translate into unacceptable deviation errors of typically 5 m-30 m. In contrast thereto, the error in SAR image geo-referencing is not susceptible to this "leverage effect". In this regard, the German TerraSAR-X has been the first radar satellite to reach a geo-referencing precision of about 0.5 m.

Known technologies for the geo-referencing of optical images are:
- manual ones, performed by measuring ground control points through GPS measurements in the terrain or in sufficiently precise cartographic material; disadvantages:
  - very complex and, in many regions of the globe, not possible or lacking the required maps,
- automatic ones, performed by correlation with optical images which have already previously been geo-referenced in a complex manner; disadvantages:
  - geo-referenced reference image data of random places on the globe often not available in the required quality,
  - no certifiable absolute precision, perpetuation of errors.

It is an object of the invention to increase the precision of the geo-referencing of optical remote sensing images.

For achieving the above object, the invention proposes a method for geo-referencing of optical remote sensing images, wherein
- an optical remote sensing image of the respective area of the earth's surface, captured by an electro-optical pickup device, is provided, or an already captured optical remote sensing image is used,
- said optical remote sensing image is geo-referenced with the aid of the existing orbit and orientation information and a digital surface model of the respective area of the earth's surface,
- an SAR image of the respective area of the earth's surface, captured by an SAR device, is provided, or an already captured SAR image is used,
- said SAR image is geo-referenced with the aid of the existing orbit information and a digital surface model of the respective area of the earth's surface,
- in the geo-referenced optical image and the geo-referenced SAR image, homologous areas are selected automatically or manually (i.e. by user intervention) which in both images correspond to the same objects on the earth's surface,
- the relative offset of the homologous areas in the optical remote sensing image and in the SAR image is detected, orientation correction parameters of said electro-optical pickup device are obtained on the basis of said relative offset, said optical image is again and finally geo-referenced with the aid of said obtained orientation correction parameters.

Advantageous modifications of the above method are defined in the subclaims.

An essential characteristic of the invention resides in that the high geo-referencing precision of SAR images, as first made available by TerraSAR-X but also to be expected in future SAR systems, is to be used for automatic or also manual correction of the geo-referencing of optical image data.

As compared to known methods, the method of the invention is one that functions independently of previous geo-referencing of optical images and, through manual or automatic image processing, will lead to highly precise geo-referencing of optical image data.

Even though the use of already previously geo-referenced optical images belongs to the state of the art, this approach—as far as known—has not yet been extended to the use of SAR images as a reference. The reason for this is to be found, on the one hand, in the basically different imaging geometries of SAR and optics and, on the other hand, in the entirely different radiometric imaging of the same objects. Thus, for instance, an area which in the optical image appears in a bright tone may happen to be dark in the SAR image, and vice versa. Simple correlation methods as normally used will thus not be suited for determining the parallaxes between the SAR image and the optical image. Instead, there have to be used more complex and robust methods, such as Mutual Information approaches or Feature-based approaches. A further reason why—as far as known—SAR images have not yet been used to improve the geo-referencing of optical data, is that SAR images with high geo-referencing precision have become available only more recently, i.e. with the advent of TerraSAR-X.

The inventive method for a particularly automatic geo-referencing of optical remote sensing image data requires, according to a first variant, apart from the optical image, a preferably highly precisely geo-referenced SAR image and a DSM of the same area on the earth. The precision of the DSM is decisive for the precision of the method. Apart from this variant, namely "optics+SAR+DSM" with an external DSM, the invention also comprises the two following variants:

the "stereo+SAR" variant: Herein, use is made of images captured by an optical stereo camera, from which there can also be derived the DSM required for geo-referencing.

the "optics+InSAR" variant: In this variant, there is used an interferometric SAR (InSAR), e.g. TanDEM-X, which, apart from the SAR image, will also deliver a DSM.

The inventive method for said "optics+SAR+DSM" variant is represented in FIG. 1. Suitably, the following units are used:

a unit for geo-referencing an SAR image and for projection into a common coordinate system. This coordinate system, into which both the SAR data and (in a next unit) the optical data are projected, can be e.g. an orthographic map projection, or also the native SAR coordinate system or the native optical coordinate system.

a unit for geo-referencing of an optical image and projection into a common (or the above-mentioned) coordinate system: This unit uses well-established methods such as, e.g., those for the orthorectifying of image data. The unit is necessary for obtaining a preliminary approximation of the geo-referencing. Also this unit will require a DSM as well as the measured parameter of the inner and the outer orientation and, respectively, the above mentioned RPCs.

a unit for selection of homologous features: This unit consists of a method for determining picture elements in the optical data and the SAR data that correspond to the same areas or objects on the earth's surface. These can be e.g. roads/paths or fields/meadows. When selecting homologous features, areas with buildings on them as well as wooded areas should be excluded because, in such areas, the different geometric imaging characteristics of the optics and the SAR will cause massive local geometric and radiometric distortions. Further, terrain presenting a sharp relief structure should be excluded because, in such an area, the available DSMs are often imprecise. If the DSM includes local information about its accuracy, areas of lower accuracy can be identified and excluded. Identification of homologous features is preferably performed automatically but can also be performed manually.

a unit for measurement of the relative offset of homologous features in the SAR image and the optical image. The result is a parallax field in the common coordinate system. For the above described reasons, one should here use methods which are robust against different radiometric properties of the objects in the SAR image and the optical image. The preferred method is the maximizing of the so-called Mutual Information. Feature-based methods, i.e. methods of the type working on edge formers, can also be used. However, depending on the method used, this unit can also be integrated into the unit for selection of homologous features.

a unit for computation of orientation correction parameters. By adjustment calculation or simple linear regression, the required orientation correction parameters are estimated from the measured parallax field. Of relevance here are primarily the observation angles, or a correction of the RPC polynomial coefficients since the position of the camera is usually very precisely known from GPS measurements.

With the aid of the orientation correction parameters obtained according to FIG. 1, the orientation information of the optical image is corrected and, thus, the improved geo-referencing into the finally desired coordinate system is performed. If the detected orientation errors exceed a limit that is to be set, the whole process will be repeated.

The inventive method in the variants "stereo+SAR" and "optics+InSAR" is nearly identical with the one described in FIG. 1. However, in a first step, the DSM inclusive of the local precision mask is computed from the stereooptical data and respectively from the interferometric SAR data in the known manner.

The applicability of the inventive method is restricted to areas in which SAR images are existent in sufficient quality as described above. For areas in cities and areas exclusively covered by woods, the precision is noticeably lower. However, relatively few and small areas in an image will suffice for determining the orientation angles with the required precision.

The inventive method can be employed in all fields of the geo-referencing of highly resolved optical images. The improvement in value and quality as compared to a usual product without this precise geo-referencing is considerable.

The invention claimed is:

1. A method for geo-referencing of optical remote sensing images of an area of the earth's surface, wherein an optical remote sensing image of the respective area of the earth's surface, captured by an electro-optical pickup device, is provided, said optical remote sensing image is geo-referenced with the aid of the existing orbit and orientation information and a digital surface model of the respective area of the earth's surface, an SAR image of the respective area of the earth's surface, captured by an SAR device, is provided, said SAR image is geo-referenced, in the geo-referenced optical remote sensing image and the geo-referenced SAR image, homologous areas are selected which in both images correspond to the same objects on the earth's surface, the relative offset of the homologous areas in the optical remote sensing image and in the SAR image is detected, orientation correction parameters are obtained on the basis of said relative offset, said optical remote sensing image is again geo-referenced with the aid of said obtained orientation correction parameters.

2. The method of claim 1, wherein said electro-optical pickup device is a 2-D camera and wherein a digital surface model is made available.

3. The method of claim 2, wherein said SAR device is an interferometric SAR and wherein said digital surface model is supplied by said interferometric SAR.

4. The method of claim 1, wherein said electro-optical pickup device is a stereo camera and wherein said digital surface model is derived from the stereo data.

5. The method of claim 1, wherein the selection of the homologous areas of the two images is performed automatically or by user intervention.

6. The method of claim 1, wherein the data of the two images are transformed into a common coordinate system.

7. The method of claim 6, wherein the data of the optical remote sensing image are transformed into the coordinate system of the data of the SAR image or vice versa.

* * * * *